(12) United States Patent
Aoyama et al.

(10) Patent No.: US 7,026,778 B2
(45) Date of Patent: Apr. 11, 2006

(54) NUMERICAL CONTROLLER

(75) Inventors: Kazunari Aoyama, Yamanashi (JP); Kunitaka Komaki, Yamanashi (JP); Yasuharu Aizawa, Yamanashi (JP)

(73) Assignee: Fanuc LTD, Yamanashi (JP)

( * ) Notice: Subject to any disclaimer, the term of this patent is extended or adjusted under 35 U.S.C. 154(b) by 0 days.

(21) Appl. No.: 10/796,277

(22) Filed: Mar. 10, 2004

(65) Prior Publication Data
US 2004/0207357 A1 Oct. 21, 2004

(30) Foreign Application Priority Data
Mar. 17, 2003 (JP) ............... 2003-071500

(51) Int. Cl.
*G05B 19/414* (2006.01)

(52) U.S. Cl. ...................... 318/600; 318/112

(58) Field of Classification Search ........ 318/569–574, 318/600–603, 111–113, 434, 450, 563
See application file for complete search history.

(56) References Cited

U.S. PATENT DOCUMENTS

| | | | | |
|---|---|---|---|---|
| 4,513,379 A | * | 4/1985 | Wilson et al. ............... | 700/181 |
| 4,632,612 A | * | 12/1986 | Loerch ........................ | 409/231 |
| 4,961,034 A | * | 10/1990 | Kakino et al. ............... | 318/600 |
| 5,237,509 A | * | 8/1993 | Ueta et al. ................... | 700/193 |
| 6,049,744 A | * | 4/2000 | Kinoshita et al. ........... | 700/195 |
| 6,147,469 A | * | 11/2000 | Uchida et al. ............... | 318/675 |

FOREIGN PATENT DOCUMENTS

| | | |
|---|---|---|
| EP | 0 597 561 A1 | 5/1994 |
| EP | 1 022 630 A1 | 7/2000 |
| JP | 1-17102 | 1/1989 |
| JP | 7-200027 | 8/1995 |

OTHER PUBLICATIONS

Dunger, O. v., et al., "Eine modulare Grundsteuerung fur flexible Montagezellen", Automatisierungstechnische Praxis—ATP, Oldebourg Verlag. Munchen, DE, vol. 32, No. 1, 1990 pp. 22-20.

Kennel, Ralph, et al., "Datenkommunikation uber das Bussystem,, SERCOS interface", Automatisierungstechnische Praxis—ATP, Oldenbourg Verlag. Mucnhen, DE, vol. 33, No. 7, Jul. 1, 1991, pp. 363-368.

* cited by examiner

*Primary Examiner*—Bentsu Ro
(74) *Attorney, Agent, or Firm*—Staas & Halsey LLP

(57) ABSTRACT

A data table stored in a numerical controller associates motors controlled by the numerical controller with information from sensors used by the motors. When the numerical controller is turned on, the contents of the data table are sent from the numerical control section to the motor control section. The motor control section controls each motor by using information from the sensors associated with the motor in the data table.

7 Claims, 3 Drawing Sheets

DATA TABLE 1

| MOTOR | SIGNAL | | |
|---|---|---|---|
| FIRST MOTOR | SENSOR S1 | , SENSOR S5 | , SENSOR Sm |
| SECOND MOTOR | SENSOR S2 | , SENSOR S6 | , SENSOR Sm |
| THIRD MOTOR | SENSOR S3 | , SENSOR S7 | , SENSOR Sm |
| FOURTH MOTOR | SENSOR S4 | , SENSOR S8 | , SENSOR Sm |
| ⋮ | ⋮ | | |

FIG. 3A

| DATA TABLE 1 ||
|---|---|
| MOTOR | SIGNAL |
| FIRST MOTOR | SENSOR S1 , SENSOR S5 , SENSOR Sm |
| SECOND MOTOR | SENSOR S2 , SENSOR S6 , SENSOR Sm |
| THIRD MOTOR | SENSOR S3 , SENSOR S7 , SENSOR Sm |
| FOURTH MOTOR | SENSOR S4 , SENSOR S8 , SENSOR Sm |
| ⋮ | ⋮ |

FIG. 3B

| DATA TABLE 2 ||
|---|---|
| MOTOR | SIGNAL |
| FIRST MOTOR | SENSOR S1 , SENSOR S5 , SENSOR Sm |
| SECOND MOTOR | SENSOR S1 , SENSOR S6 , SENSOR Sm |
| THIRD MOTOR | SENSOR S3 , SENSOR S7 , SENSOR Sm |
| FOURTH MOTOR | SENSOR S4 , SENSOR S8 , SENSOR Sm |
| ⋮ | ⋮ |

FIG. 3C

| DATA TABLE 3 ||
|---|---|
| MOTOR | SIGNAL |
| FIRST MOTOR | SENSOR S5 , SENSOR S6 , SENSOR Sm |
| SECOND MOTOR | SENSOR S2 , SENSOR S6 , SENSOR Sm |
| THIRD MOTOR | SENSOR S3 , SENSOR S7 , SENSOR Sm |
| FOURTH MOTOR | SENSOR S4 , SENSOR S8 , SENSOR Sm |
| ⋮ | ⋮ |

NUMERICAL CONTROLLER

BACKGROUND OF THE INVENTION

1. Field of the Invention

The present invention relates to a numerical controller for controlling a machine tool or the like and, more particularly, to a numerical controller with a novel system configuration of sensors and servo motors that use signals from the sensors.

2. Description of the Related Art

FIG. 1 is a block diagram illustrating the main elements of a system in which a numerical controller controls a machine tool or the like in one conventional mode. The numerical controller (CNC) 10 comprises a numerical control section 11 and a motor control section 12 that controls motors.

Following a machining program or the like, the numerical control section 11 outputs movement commands for individual motors to a motor control section 12. The motor control section 12 uses the commands to perform control functions such as position loop control and velocity loop control, generate pulse width modulation (PWM) signals for rotating the individual servo motors, and output the PWM signals to servo amplifiers 20, 21, 22, . . . for the corresponding servo motors. Servo amplifiers 20, 21, 22, . . . rotate respective servo motors 30, 31, 32, . . . according to the PWM signals.

Encoders 40, 41, 42, . . . attached to respective servo motors 30, 31, 32, . . . sense the rotational positions or rotational speeds of servo motors 30, 31, 32, . . . . The sensed rotational positions or rotational speeds of servo motors 30, 31, 32, . . . are fed back to the motor control section 12 in the CNC through servo amplifiers 20, 21, 22, . . . for use in position loop control or velocity loop control.

Tables and other movable parts driven by servo motors 30, 31, 32, . . . are provided with sensors S1, S2, S3, . . . that sense the positions of the respective movable parts. Signals from sensors S1, S2, S3, . . . are fed back to the CNC 10 through servo amplifiers 20, 21, 22, . . . , respectively. If sensors S1, S2, S3, . . . are linear scales that sense the positions of the tables or other movable parts, the motor control section 12 performs feedback control concerning the positions of the movable parts on the basis of the feedback signals from these sensors. The correspondence among sensors S1, S2, S3, . . . , servo amplifiers 20, 21, 22, . . . , and motors 30, 31, 32, . . . is fixed and unchangeable.

FIG. 2 shows the configuration of another conventional numerical controller system, in which a plurality of servo amplifiers 20, 21, 22, 23, and a plurality of interface units 50, 51, . . . are daisy-chained to a numerical controller (CNC) 10 through a serial bus. Also connected to interface units 50, 51, . . . are sensors S1, S2, S3, . . . , such as linear scales that sense the positions of servo motor driven tables and other movable parts, sensors that sense temperatures, pressures, voltages, currents, and other quantities, and limit switches.

Signals sensed by sensors S1, S2, . . . are sent to the CNC 10 through interface units 50, 51, . . . . The CNC 10 receives the signals from sensors S1, S2, . . . sequentially, identifies the sensor signals according to their order of reception, and relates the sensors S1, S2, . . . to the servo motors 30, 31, . . . . Sensors S1 to S4 are, for example, linear scales, sensor S1 sensing the position of the movable part driven by servo motor 30, sensor S2 sensing the position of the movable part driven by servo motor 31, sensor S3 sensing the position of the movable part driven by servo motor 32, and sensor S4 sensing the position of the movable part driven by servo motor 33. The motor control section 12 then uses the signal from sensor S1 for the position loop control of servo motor 30. Likewise, the motor control section 12 uses the signals from sensors S2, S3, S4 for servo motors 31, 32, 33, respectively. These correspondences are fixed.

When a movable table or another part of a machine tool must move at high speed or the machine tool is large, a large torque is required. In this case, a plurality of servo motors may be used to drive the table or the other part. Although the table or the other part is driven by a plurality of servo motors, a single sensor (linear scale) is attached to it for sensing its position or speed, creating a need to share the signal sensed by the linear scale among the plurality of servo motors. Another need is to share emergency stop signals and other signals from the machine among a plurality of servo amplifiers and servo motors.

In the system in FIG. 1, however, the linear scales or other sensors correspond to the servo motors on a one-to-one basis, preventing the use of signals from a single sensor for the control of a plurality of servo motors. The system in FIG. 2 allows the associations between servo motors and sensors to be changed, but does not allow signals from a plurality of sensors to be used by a single servo motor, nor does it permit signals from a single sensor to be used by a plurality of servo motors. Therefore, signals from sensors used by other servo amplifiers cannot be used directly.

To enable the use of signals from other non-assigned sensors in this system, the motor control section 12 has to transfer signals from one servo motor to another, hindering the high-speed control required for servo motors 30 to 33.

SUMMARY OF THE INVENTION

The numerical controller according to the present invention comprises a numerical control section that outputs movement commands and a motor control section that controls motors according to the movement commands from the numerical control section; the numerical controller further comprises interface units that receive signals from sensors and send the received signals to the motor control section, and a data table that stores correspondences between sensors and motors. The motor control section receives a signal from the sensor through the interface unit and controls the motor corresponding to the sensor, based on the correspondence of the sensor and motor set in the data table,.

Sensors may correspond to motors on a one-to-one, one-to-n, or n-to-one basis (n is an integer greater than or equal to two). Emergency stop signals can also be placed in correspondence with the motors as sensor signals.

The present invention provides a numerical controller that can be set so that signals from a plurality of sensors can be used freely for the servo motors controlled by the numerical controller.

BRIEF DESCRIPTION OF THE DRAWINGS

The purposes and advantages of the present invention, including those described above, will be clarified by reference to the attached drawings in combination with the description of the embodiment presented below. Of these drawings:

FIG. 1 is a block diagram indicating the main elements of a conventional control system in which a numerical controller is used for a machine tool or like;

FIG. 2 is a block diagram indicating the main elements of a control system which may embody either the prior art or the present invention, and in which a numerical controller is used for a machine tool or the like; and FIGS. 3A to 3C illustrate exemplary data tables used in the present invention.

DESCRIPTION OF THE EMBODIMENTS

Figure 1:
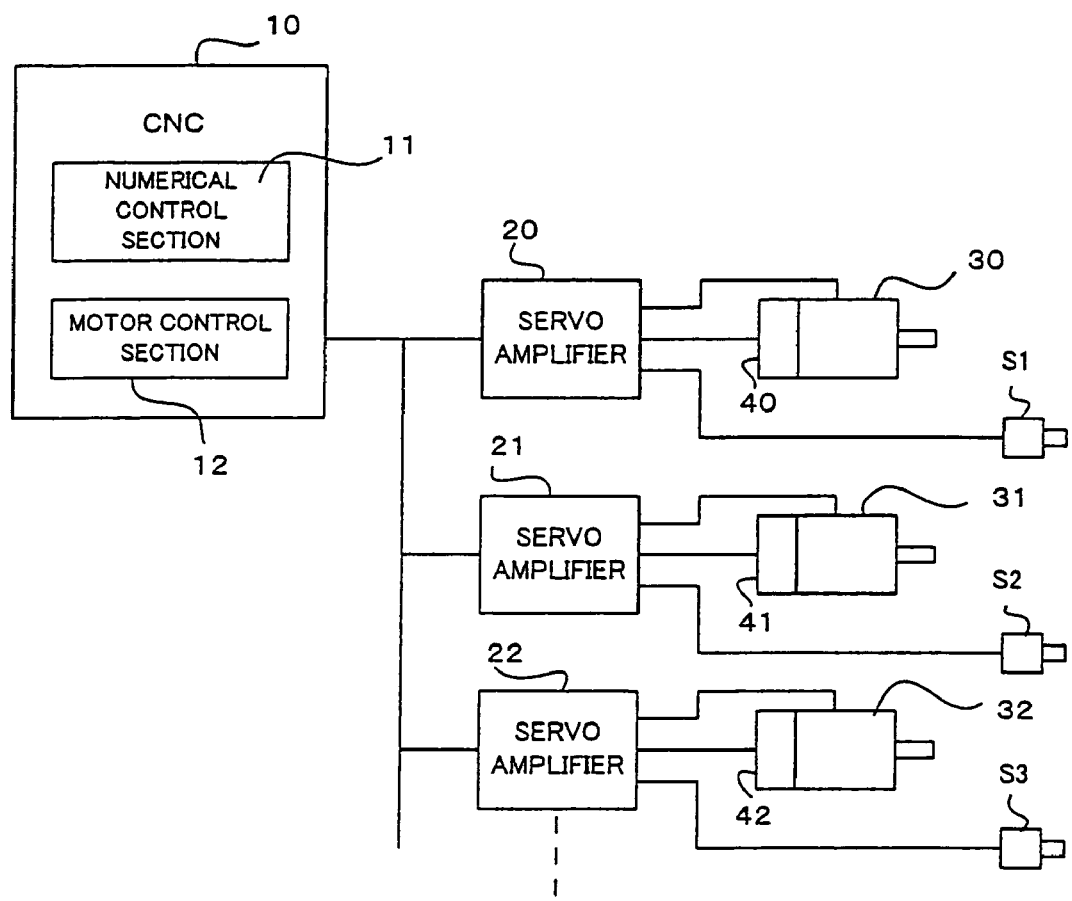

A first embodiment of the present invention will be described below by using the exemplary numerical controller, shown in FIG. 2, to which servo amplifiers and interface units are connected in a daisy chain fashion. The numerical controller (CNC) 10 is connected to servo amplifiers 20 to 23 and interface units 50, 51, . . . in a daisy chain fashion through a serial bus. Signals from the sensors S1 to S4, S5 to S8, . . . used by the servo motors are collected at respective interface units 50, 51, . . . , and sent to the CNC 10. The CNC 10 receives these sensor signals in a predetermined order.

So far this is similar to the prior art. In the present invention, however, a data table that defines the correspondence between servo motors and sensors is provided so that each servo motor can use signals from arbitrary sensors.

The CNC 10 in this embodiment has a data table that associates servo motors with the signals from the sensors as shown in FIG. 3A, 3B, or 3C.

For example, suppose that sensors and servo motors are associated as follows: sensor S1 is a linear scale that senses the position of the movable part driven by the first servo motor 30; sensor S2 is a linear scale that senses the position of the movable part driven by the second servo motor 31; sensor S3 is a linear scale that senses the position of the movable part driven by the third servo motor 32; sensor S4 is a linear scale that senses the position of the movable part driven by the fourth servo motor 33. The signals from sensors S5, S6, S7, S8 are used for the control of the first, second, third, and fourth servo motors 30, 31, 32, 33, respectively. Also suppose that a signal from a sensor Sm (not shown in FIG. 2) can be sent to servo motors 30 to 33 as an emergency stop signal.

The correspondence between sensors and servo motors described above is defined in data table 1 shown in FIG. 3A. Data table 1 assigns sensors S1, S5, Sm to the first servo motor 30, sensors S2, S6, Sm to the second servo motor 31, sensors S3, S7, Sm to the third servo motor 32, and sensors S4, S8, Sm to the fourth servo motor 33. Data table 1 is stored in the numerical control section 11 with these settings.

When the CNC 10 storing data table 1 shown in FIG. 3A is turned on and the system is started up, the numerical control section 11 transfers the contents of data table 1 to the motor control section 12. The motor control section 12 in the CNC 10 then receives the sensor signals sent from sensors S1, S2, S3, S4, S5, . . . in that order through the daisy-chained serial bus. The motor control section 12 identifies the sending sensors according to the order in which the sensor signals are received, and determines the servo motors corresponding to the identified sensors with reference to data table 1. The motor control section 12 then controls the servo motors according to the received sensor signals.

Assuming that sensors S1, S2, S3, S4 are linear scales that sense the positions of the movable parts driven by the first to fourth servo motors 30, 31, 32, 33, respectively, the motor control section 12 performs position loop control on each of the first to fourth servo motors (30 to 33) individually by using the signals from sensors S1, S2, S3, S4, referring to data table 1. If an emergency stop signal is input from the sensor Sm associated with all the servo motors, the motor control section 12 stops the operation of all the servo motors.

In another example, one movable part such as a table is driven by the first and second servo motors and the position of the movable part is sensed by a single linear scale (sensor S1, for example). In this case, to perform position loop control on the first and second servo motors according to the signal from the single linear scale, the motor control section 12 associates the first and second servo motors with sensor S1 as shown in data table 2 in FIG. 3B. In this example, sensor S2 is absent.

In yet another example, shown in FIG. 3C, the signal from sensor S6 is used to control the first servo motor 30 and second servo motor 31, and the first servo motor 30 uses the signal from sensor S5 instead of the signal from sensor S1. Then data table 3, in which sensors S5 and S6 are associated with the first servo motor 30 and sensors S2 and S6 with the second servo motor 31, can be set and stored.

As described above, single-sensor signals entering the numerical controller through an interface unit can be shared with a plurality of servo motors according to the settings in the data table. Conversely, a single servo motor can use signals from a plurality of sensors. Any one or more sensors can be associated with any one or more servo motors just by setting arbitrary correspondences between servo motors and sensors in a data table. Therefore, by using a data table, the inventive numerical controller permits easy system alteration and expansion.

Figure 2:
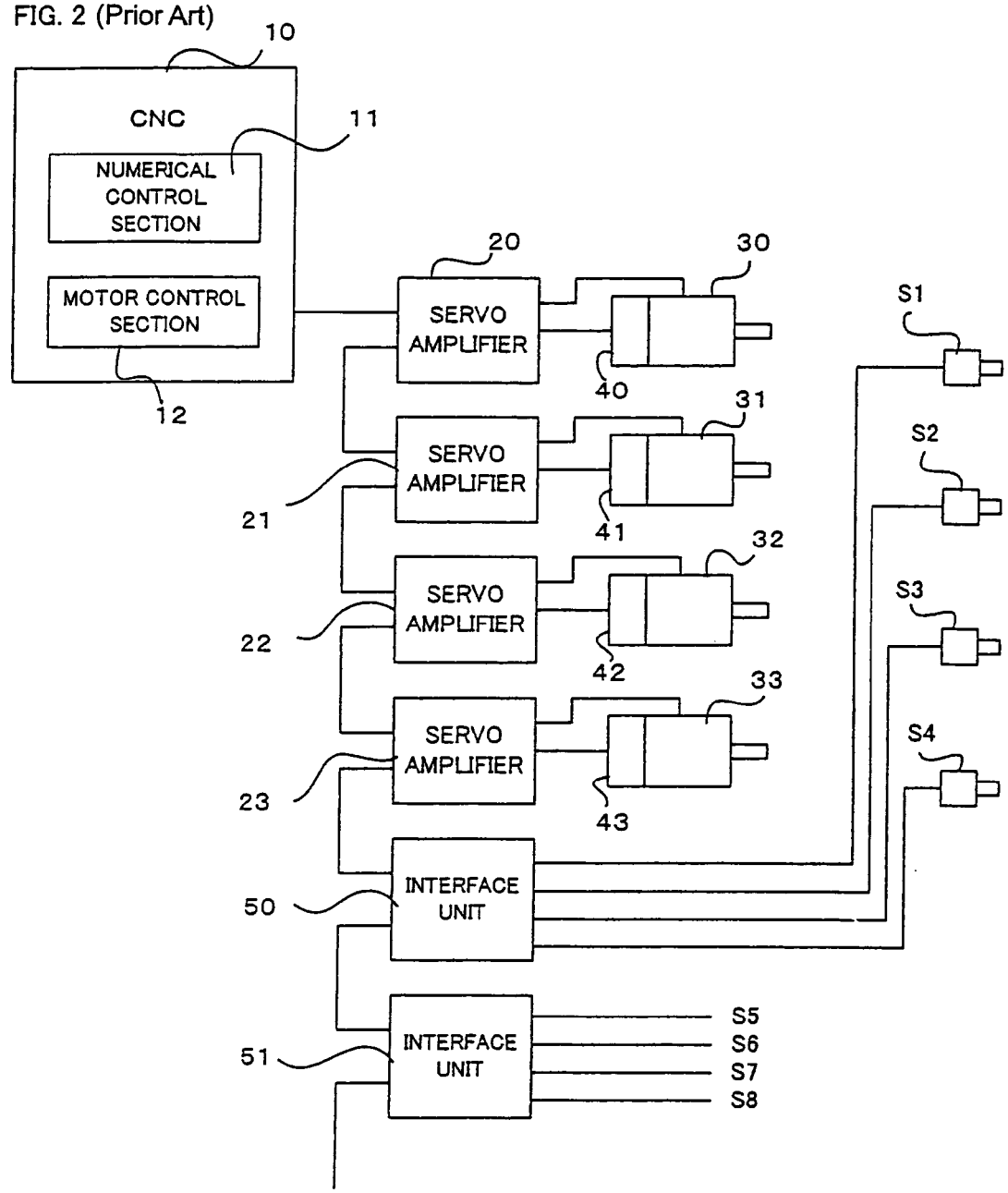

In the embodiment in FIG. 2, a single motor control section 12 is provided in the CNC 10. However, as many motor control sections 12 as there are servo motors may be installed. Motor control sections 12 can also be installed in servo amplifiers.

In the embodiment described above, a plurality of sensors are connected to the numerical controller through a serial bus. However, a parallel bus may be used for connecting the plurality of sensors, in which case the sensor signals are read in a predetermined pattern and the corresponding sensors are identified from the order of the sensor signals in the pattern, rather than the order in which the signals are received.

In a servo system, all sorts of applications can be handled easily: information from a plurality of sensors can be used for controlling a single servo motor, information from a single sensor can be used for controlling a plurality of servo motors. Since input signals received by the numerical controller can be monitored directly by the processor in the motor control section, input/output control of a grouped plurality of axes can be achieved easily.

The invention claimed is:

1. A numerical controller having a numerical control section that outputs movement commands and a motor control section that controls motors according to the movement commands from the numerical control section, the numerical controller comprising:

an interface unit for receiving signals from sensors and sending the received signals to the motor control section; and a data table storing a correspondence between the sensors and the motors, wherein the motor control section receives the signals from a plurality of sensors through the interface unit and controls one motor corresponding to the plurality of sensors according to the correspondence between the sensors and the motors set in the data table, and an emergency stop signal is associated with the motors as one of the sensor signals.

2. A numerical controller in which a plurality of servo amplifiers and one interface unit or a plurality of interface units are interconnected through a serial bus in a daisy chain fashion, the numerical controller comprising:
  a plurality of servo motors controlled by the plurality of servo amplifiers;
  a plurality of sensors, including a sensor that senses the position of a movable part driven by at least one of the servo motors; and
  a memory storing a data table in which one or more of the sensors in the plurality of sensors are assigned to each of the plurality of servo motors; wherein:
  the interface unit receives a plurality of signals from the sensors and sends the plurality of signals to the numerical controller; and
  the numerical controller receives the signals sent from the plurality of sensors through the interface unit sequentially, identifies a sensor that has sent each of the signals according to an order of reception of the signals, determines a servo motor corresponding to the identified sensor with reference to the data table, and controls the determined servo motor according to the signal received from the sensor.

3. The numerical controller of claim 2, wherein the sensors include at least one of a linear scale that senses the position of a table driven by a servo motor, a sensor that senses a temperature, a pressure, a voltage, or a current, and a limit switch.

4. A numerical controller of having a numerical control section that outputs movement commands and a motor control section that controls motors according to the movement commands from the numerical control section, the numerical controller comprising:
  an interface unit receiving signals from sensors and sending the received signals to the motor control section; and
  a data table storing a correspondence between the sensors and the motors,
  wherein the motor control section receives the signals from a plurality of sensors through the interface unit and controls one motor corresponding to the plurality of sensors according to the correspondence between the sensors and the motors set in the data table,
  the correspondence between the sensors and the motors is n-to-one (n being an integer greater than or equal to two), and
  an emergency stop signal is associated with the motors as one of the sensor signals.

5. A numerical controller having a numerical control section that outputs movement commands and a motor control section that controls motors according to the movement commands from the numerical control section, the numerical controller comprising:
  an interface unit receiving signals from sensors and sending the received signals to the motor control section; and
  a data table storing a correspondence between the sensors and the motors,
  wherein the motor control section receives the,signals from one sensor through the interface unit and controls a plurality of motors corresponding to the one sensor according to the correspondence between the sensors and the motors set in the data table, and
  an emergency stop signal is associated with the motors as one of the sensor signals.

6. A numerical controller having a numerical control section that outputs movement commands and a motor control section that controls motors according to the movement commands from the numerical control section, the numerical controller comprising:
  an interface unit receiving signals from sensors and sending the received signals to the motor control section; and
  a data table storing a correspondence between the sensors and the motors,
  wherein the motor control section receives the signals from the sensors through the interface unit and controls the motors corresponding to the sensors according to the correspondence between the sensors and the motors set in the data table; and
  an emergency stop signal is associated with the motors as one of the sensor signals.

7. A numerical controller having a numerical control section that outputs movement commands and a motor control section that controls motors according to the movement commands from the numerical control section, the numerical controller comprising:
  an interface unit receiving signals from sensors and sending the received signals to the motor control section; and
  a data table storing a correspondence between the sensors and the motors,
  wherein the motor control section receives the signals from the sensors through the interface unit and controls the motors corresponding to the sensors according to the correspondence between the sensors and the motors set in the data table,
  the correspondence between the sensors and the motors is one-to-one, one-to-n, or n-to-one (n being an integer greater than or equal to two), and
  an emergency stop signal is associated with the motors as one of the sensor signals.

\* \* \* \* \*

UNITED STATES PATENT AND TRADEMARK OFFICE
CERTIFICATE OF CORRECTION

PATENT NO. : 7,026,778 B2
APPLICATION NO. : 10/796277
DATED : April 11, 2006
INVENTOR(S) : Kazunari Aoyama et al.

It is certified that error appears in the above-identified patent and that said Letters Patent is hereby corrected as shown below:

First Page Column 2 (Other Publications), Line 3, change "Oldebourg" to --Oldenbourg--.

First Page Column 2 (Other Publications), Line 4, after "1990" insert --,--.

First Page Column 2 (Other Publications), Line 5-6, after "Bussystem," delete ",".

First Page Column 2 (Other Publications), Line 7, change "Mucnhen," to --Munchen,--.

Column 2, Line 46, change "table,." to --table.--.

Column 4, Line 54, after "unit" delete "for".

Column 5, Line 27, after "controller" delete "of".

Column 6, Line 6, delete "," before "signals".

Column 6, Line 27, change "table;" to --table,--.

Signed and Sealed this

Seventh Day of November, 2006

JON W. DUDAS
*Director of the United States Patent and Trademark Office*